(12) United States Patent
Wheat

(10) Patent No.: US 12,018,995 B2
(45) Date of Patent: Jun. 25, 2024

(54) SYSTEM AND METHOD FOR PULLEY WEAR MONITORING

(71) Applicant: BRAIME GROUP PLC, Leeds (GB)

(72) Inventor: Jonathan Norman Wheat, Morton, IL (US)

(73) Assignee: Braime Group PLC (GB)

( * ) Notice: Subject to any disclaimer, the term of this patent is extended or adjusted under 35 U.S.C. 154(b) by 286 days.

(21) Appl. No.: 17/032,214

(22) Filed: Sep. 25, 2020

(65) Prior Publication Data

US 2022/0099525 A1   Mar. 31, 2022

(51) Int. Cl.
| | |
|---|---|
| *G01M 13/021* | (2019.01) |
| *B65G 39/00* | (2006.01) |
| *B65G 39/07* | (2006.01) |
| *B65G 43/02* | (2006.01) |
| *F16H 55/36* | (2006.01) |
| *G06K 19/07* | (2006.01) |
| *G08B 21/18* | (2006.01) |

(52) U.S. Cl.
CPC ....... *G01M 13/021* (2013.01); *G06K 19/0723* (2013.01); *G08B 21/18* (2013.01)

(58) Field of Classification Search
CPC .................................................. G01M 13/021
See application file for complete search history.

(56) References Cited

U.S. PATENT DOCUMENTS

| | | | |
|---|---|---|---|
| 8,036,774 B2 | 10/2011 | Blust et al. | |
| 2006/0124214 A1* | 6/2006 | Bauchot | B60C 11/24 |
| | | | 702/34 |
| 2006/0219528 A1* | 10/2006 | Aizawa | G01K 7/36 |
| | | | 374/E7.039 |
| 2006/0273148 A1* | 12/2006 | Karstens | B60C 11/24 |
| | | | 235/375 |
| 2007/0252718 A1* | 11/2007 | Ray | G03G 21/1657 |
| | | | 340/572.1 |
| 2011/0133923 A1* | 6/2011 | Evans | B60T 17/221 |
| | | | 340/454 |
| 2014/0336812 A1* | 11/2014 | Rathmann | B65G 43/02 |
| | | | 700/213 |
| 2018/0304277 A1* | 10/2018 | Heinrichs | B03B 5/32 |

(Continued)

FOREIGN PATENT DOCUMENTS

EP   1915967 B1   4/2008

*Primary Examiner* — Joseph H Feild
*Assistant Examiner* — Pameshanand Mahase
(74) *Attorney, Agent, or Firm* — Jeanette M. Braun; Braun IP Law, LLC

(57) ABSTRACT

A system and method for monitoring the wear of a pulley. A wear monitor pulley comprises a pulley comprising a curved shell, cylindrical body, and at least one wear monitor affixed to, or embedded in, the pulley, lagging, or backing, wherein the wear monitor transmits information about the pulley through electromagnetic fields. A method comprising affixing at least one wear monitor on a wear monitor pulley, associating information and data about the wear monitor pulley with the at least one wear monitor affixed to the at least one wear monitor pulley, transmitting a signal from the at least one wear monitor using electromagnetic fields from the at least one wear monitor to a wear monitor reader, reading the signal sent by the at least one wear monitor with the wear monitor reader, and determining whether the at least one wear monitor has sent the signal.

20 Claims, 2 Drawing Sheets

(56) References Cited

U.S. PATENT DOCUMENTS

2019/0145462 A1* 5/2019 Jansa .................... G01M 13/04
  384/416
2019/0184763 A1* 6/2019 Pulford ................ B60C 11/243

\* cited by examiner

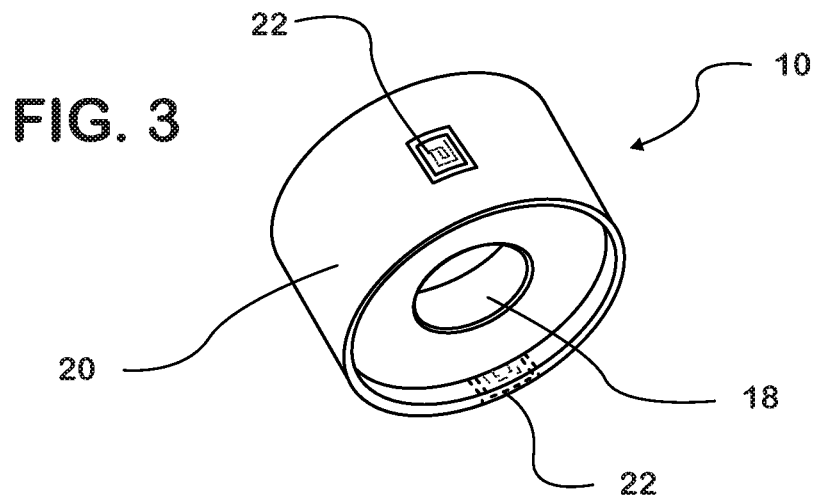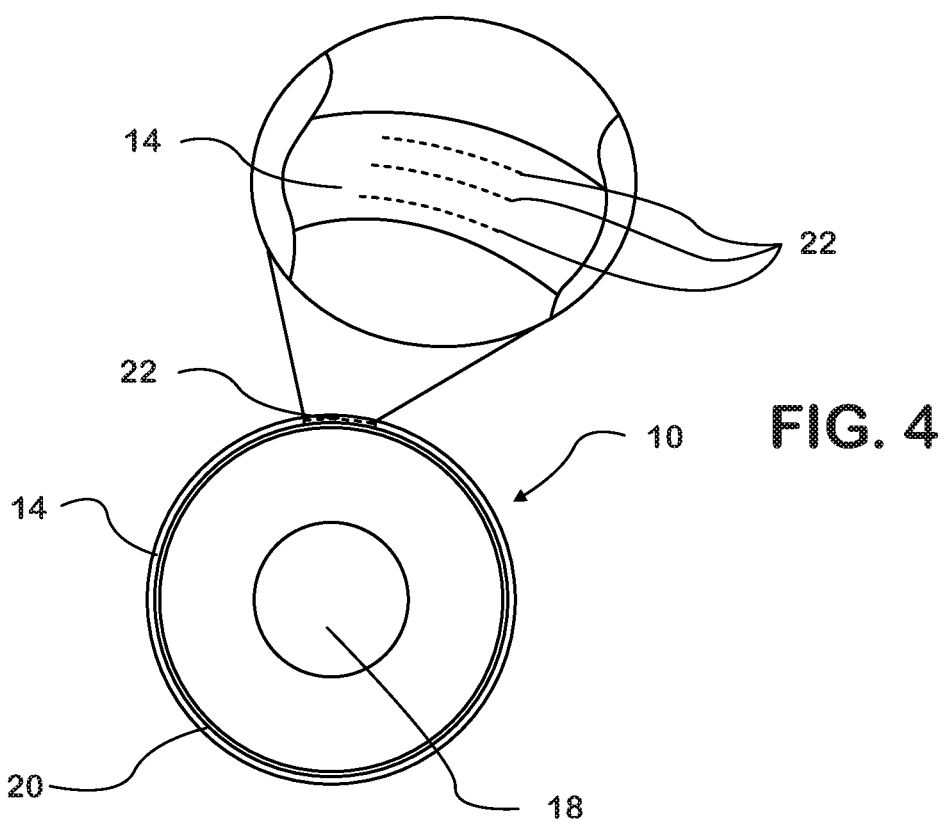

SYSTEM AND METHOD FOR PULLEY WEAR MONITORING

BACKGROUND

A common application for pulleys is to support rotating conveyor belt systems.

A longstanding problem with pulleys relates to dynamic wear. Lagging can be attached to pulleys to transfer power from the movement of the pulley to a conveyor belt. Pulley and lagging systems need to be visually inspected to determine if the pulleys and lagging are in good repair or need to be replaced. This requires shutting down the pulley system and having a person visually inspect each pulley and lagging for damage. The loss of usability of the pulley and lagging system results in loss of efficiency, capacity, and profitability for the user.

Accordingly, there has been a need to develop a pulley system that can be monitored for wear damage without needing to shut down the system to visually inspect the parts.

Pulleys and lagging can be made from many types of materials, and material selection is typically based on cost, environmental factors, and the application of the pulley system.

SUMMARY

The present disclosure provides a pulley, particularly a pulley comprising at least one wear monitor affixed to a pulley or lagging.

In one embodiment, a pulley system has at least one wear monitor, wherein the wear monitor transmits information about the pulley through electromagnetic fields.

In one embodiment, at least one wear monitor is a RFID tag.

In one embodiment, at least one wear monitor is embedded into the lagging.

In one embodiment, the pulley comprises at least two wear monitors.

In one embodiment, the wear monitor is removably affixed to the pulley.

In one embodiment, at least one wear monitor is a passive wear monitor.

In one embodiment, the passive wear monitor is a RFID tag.

In one embodiment, at least one wear monitor is embedded into the pulley during manufacturing of the pulley.

In one embodiment, the wear monitor is removably affixed to the pulley with fasteners, adhesives, cold welding, or a combination thereof.

In one embodiment, at least two wear monitors are embedded into the pulley during the manufacturing of the pulley.

In one embodiment, at least two wear monitors are affixed into or onto the pulley's lagging.

In one embodiment, at least one wear monitor is oriented at an angle and at least one corner of said at least one wear monitor is aligned with an end of the pulley.

Those skilled in the art will further appreciate the above-mentioned advantages and superior features of the invention together with other important aspects thereof up reading the detailed description which follows in conjunction with the drawings.

BRIEF DESCRIPTION OF THE DRAWINGS

FIG. 3 illustrates a top perspective view of one embodiment of a pulley comprising at least two wear monitors, one affixed to an edge of a pulley and one affixed centrally on the pulley cylinder; and FIG. 4 illustrates a side plan view of one embodiment of a pulley comprising at least two wear monitors embedded in the lagging.

DESCRIPTION OF THE PREFERRED EMBODIMENTS

Figure 1:
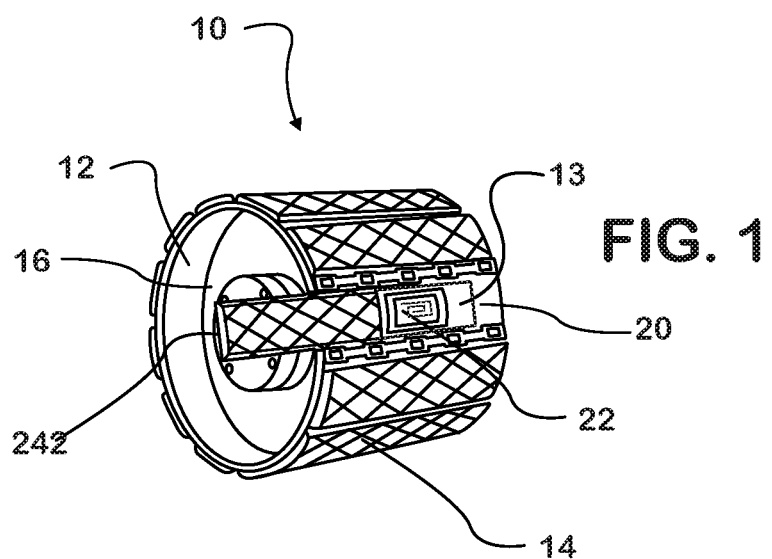
FIG. 1 illustrates a perspective view of one embodiment of pulley comprising at least one wear monitor affixed to a backing of lagging.

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Accordingly, the detailed discussion herein of one or more embodiments is not intended, nor is it to be construed, to limit the boundaries of the descriptions but rather as defined by the claims and equivalents thereof. Therefore, embodiments not specifically addressed herein, such as adaptations, variations, modifications, and equivalent arrangements, should be and are considered to be implicitly disclosed by the illustrative embodiments and claims set forth herein and therefore fall within the scope of the present invention.

Further, it should be understood that, although steps of various claimed methods may be shown and described as being in a sequence or temporal order, the steps of any such method are not limited to being carried out in any particular sequence or order, absent an indication otherwise. That is, the claimed method steps are considered capable of being carried out in any sequential combination or permutation order while still falling within the scope of the present disclosure.

Additionally, it is important to note that each term used herein refers to that which a person skilled in the relevant art would understand such term to mean, based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. Also, the term "or" denotes "at least one of the items," but does not exclude a plurality of items of the list.

In the description which follows, like parts are marked throughout the specification and drawings with the same reference numerals, respectively. The drawing figures may not necessarily be to scale and certain features may be shown in somewhat schematic form in the interest of clarity and conciseness.

Referring to FIG. 1, there is illustrated one embodiment of a wear monitor pulley comprising at least one wear monitor and generally designated by the numeral 10. A pulley 12 is characterized by a curved shell 20 covering the circumference of a cylindrical body 16 comprising a throughbore 18 (see FIGS. 2-4). The wear monitor pulley 10 can comprise lagging 14 affixed to the curved shell 20 of the pulley 12.

The lagging 14 is a layer of material affixed to the curved shell 20 to protect the curved shell 20 damage caused by friction and heat generated when the pulley 12 is in use. The lagging 14 can also dispense or disburse water off the pulley 12 to improve contact between a conveyor belt and the pulley 12. Water on the pulley 12 may cause a conveyor belt to slip.

At least one wear monitor 22 can be affixed to the pulley 12. The at least one wear monitor 22 can be affixed to any portion of the pulley 12 that wears away. The at least one wear monitor 22 can be affixed to a backing 13 of the lagging 14. The backing 13 of a lagging 14 can be metal, plastic, or any material suitable for withstanding the forces put on a pulley 12 when it is in use. The at least one wear monitor 22 can be affixed to the backing 13, the underside surface 24 of the lagging 14, embedded in the lagging 14, or embedded in the curved shell 20 while the pulley is being manufactured. The at least one wear monitor 22 may be affixed to the pulley 12 after the pulley 12 has been manufactured. The at least one wear monitor 22 can be a wireless, non-contact tag or chip that uses electromagnetic fields to transmit to, and receive signals from, a wear monitor reader (not shown), such as a radio frequency identification tag. The at least one wear monitor 22 can be an active monitor and require a battery, or a passive monitor and not require a battery.

Figure 2:
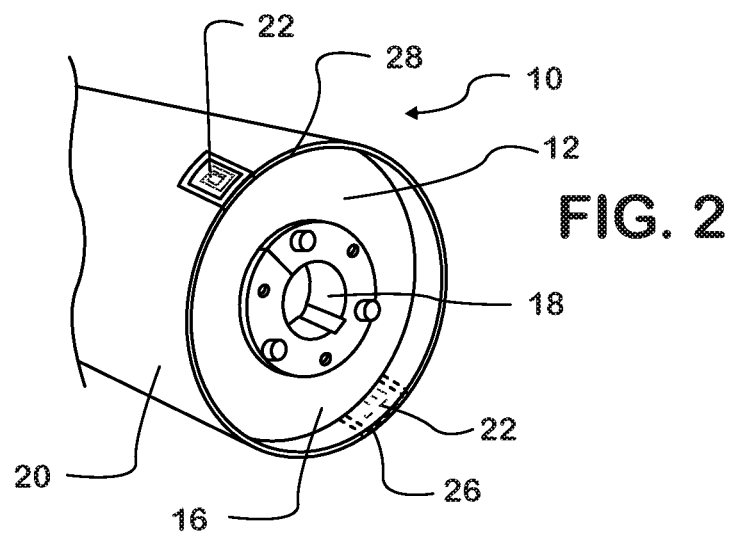
FIG. 2 illustrates a perspective view of one embodiment of a pulley comprising at least two wear monitors affixed to a curved shell of a pulley.

Turning to FIG. 2, one embodiment of the wear monitor pulley 10 is illustrated in a perspective view for exemplary purposes. The pulley 12 is shown without lagging 14, though lagging 14 can easily be added, and comprises at least two wear monitors 22. At least two wear monitors 22 can be affixed to the curved shell 20, and can be oriented at different angles from each other or oriented at the same angles as each other. One of the at least two wear monitors 22 can be positioned in a skewed position or at an angle, having at least one corner of the one wear monitor 22 pointing towards an edge of the curved shell 20. In another aspect of the disclosure, as shown, the at least two wear monitors 22 can be positioned so that an edge 26 of the wear monitor 22 is parallel with an edge 28 of the curved shell 20. Both of the at least two wear monitors 22 may be oriented in the same position as each other or in different positions as each other.

Turning to FIG. 3, a top perspective view of one embodiment of a wear monitor pulley 10 for exemplary purposes. At least one wear monitor can be affixed to the curved shell 20. The at least one wear monitor 22 can be affixed to the curved shell 20 by cold welding, adhesive, fasteners, or embedding the wear monitor into the pulley 12. This disclosure is not intended to be limited to where the at least one wear monitor 22 is placed on the pulley 12, lagging 14, or backing 13. The position of the at least one wear monitor 22 can be any location where the material of, or attached to, the pulley 12 wears away. The curved shell 20 may comprise a crown point located around the pulley 12. The crown point is a raised area of the curved shell 20 that helps keeps a conveyor belt (not shown) centered on the pulley and helps stops the drifting of the conveyor belt while the conveyor belt is in motion. The at least one wear monitor 22 can be positioned along the crown point (centrally) to monitor the wear of the crown point from use of the pulley 12 and the friction caused by a conveyor belt (not shown) on the pulley 12.

Turning to FIG. 4, a front plan view of one embodiment of a wear monitor pulley 10 with at least two wear monitors 22 embedded into the lagging 14. An expanded view of the at least two wear monitors 22 embedded into the lagging 14 is illustrated for exemplary purposes. The at least two wear monitors 22 can be layered or stacked on top of each other, with a layer of lagging 14 material between each wear monitor 22. As the lagging 14 wears away, the at least one wear monitor 22 will be damaged or removed from the lagging 14, and the wear monitor reader will not receive a signal from the damaged or removed at least one wear monitor 22. The extent, or depth, of the damage to the lagging 14 can be determined by analyzing the lack of signals received from the at least one wear monitor 22 after it is damaged or removed due to use of the pulley 12. As shown in FIG. 4, at least 3 wear monitors 22 are stacked and embedded into the lagging 14, and if the top two monitors 22 are removed due to use and wear of the lagging 14, they will stop sending signals to the wear reader (not shown). The lack of signals from the at least two monitors 22 will tell a user how much of the lagging 14 has been damaged.

Referring to FIGS. 1, 2, 3, and 4, at least one wear monitor 22, which can be an RFID tag or chip, is affixed to the pulley 12, along a portion of the pulley 12 that wears away from use.

The at least one wear monitor 22 is in communication with a wear monitor reader, which can be an RFID reader (not shown). The wear monitor reader can be located on a structure (e.g., a wall of the enclosure for the process equipment) and oriented in a position to read the at least one wear monitor 22 as it rotates about a shaft (not shown) inserted into the throughbore 18. Typically, a pulley is a stationery object that rotates to drive the movement of another object. The one wear monitor reader communicates with the at least one wear monitor 22 by receiving signals from it. If the at least one wear monitor 22 is not detected by the wear monitor reader (not shown), an alarm can be triggered or an alert can be sent to a computer or mobile device indicating the pulley 12 needs repair.

The wear monitor 22 can be associated with information about the pulley 12 that it is attached thereto and the information can be accessed via a wired or wireless network. The information can be stored in a searchable database and include a serial number, an origin, a date of manufacture, the material composition of the pulley 12, a last service or repair or replace date, or any other information that would be beneficial to know about the pulley 12. This stored information can enable a user to quickly determine which pulley 12 needs repair in a system, such as a material conveyor system, and reduce down time of the material conveyor system.

In some embodiments, the wear reader in communication with the at least one wear monitor 22 is capable of time stamping and/or date stamping each reading received at the wear monitor reader (not shown) from the at least one wear monitor 22. The time stamp and/or date stamp information can be used to measure and/or determine the speed and/or velocity at which pulley 12 is rotating. The optimal or preferred speed and/or velocity can be prerecorded or stored in a database in a computer and compared to the calculated or determined speed and/or velocity obtained by analyzing information received from the wear reader.

In some embodiments, a controller or computer comprising a software application or mobile device receives information from the wear monitor reader (not shown) that signals the at least one wear monitor 22 has not been detected. The controller then provides diagnostic information to a user. This information can include when the pulley 12 was installed, how many hours the pulley 12 has been in operation, where the wear monitor 22 was attached to the pulley 12, etc.

In some embodiments, the signal strength of the at least one wear monitor 22 is high. The wear monitor reader (not shown) may detect a decrease in signal strength and provide an alert that the at least one wear monitor 22 has been damaged.

The at least one wear monitor 22 can be encased in the pulley 12, either by the material used to create the pulley 12, or by a lagging 14 material, and rigidly affixed to the pulley 12. A casing may be placed around the at least one wear monitor 22 to protect it from the heat and pressure during the forming of the pulley 12. In some embodiments, a tuning circuit in the at least one wear monitor 22 tunes the wear monitor 22 once the wear monitor 22 is activated and ready for use.

As a portion of the pulley 12, or the lagging 14, wears away, the wear monitor 22 becomes exposed and can be damaged while the pulley 12 is operating. A wear monitor reader (not shown) can be fixed in place and located within a range of the wear monitor to receive and send signals to the wear monitor 22. The wear monitor reader (not shown) can be a hand held and mobile reader.

Although preferred embodiments of the invention have been described in detail herein, those skilled in the art will recognize that various substitutions and modifications may be made without departing from the scope and spirit of the appended claims.

I claim:

1. A wear monitor pulley comprising:
a pulley comprising a curved shell, cylindrical body, and a throughbore through a center of the cylindrical body, and at least one wear monitor not comprising wires or circuits extending outwardly from the at least one wear monitor that are in an elongated U-shaped configuration forming a closed loop that is connected electrically to the at least one wear monitor;
the at least one wear monitor being affixed to the pulley, a backing, or lagging, wherein each of the at least one wear monitor transmits a signal using electromagnetic fields when first affixed to the pulley, the backing, or lagging; and
each of the at least one wear monitor signal not being detected when the pulley has been worn or sustained damage.

2. The wear monitor pulley of claim 1, wherein the at least one wear monitor is a RFID tag.

3. The wear monitor pulley of claim 1, wherein the at least one wear monitor is affixed to the curved shell.

4. The wear monitor pulley of claim 3, wherein the at least one wear monitor is embedded into the lagging.

5. The wear monitor pulley of claim 1, wherein the at least one wear monitor is a passive wear monitor.

6. The wear monitor pulley of claim 1, wherein the at least one wear monitor is an active wear monitor.

7. The wear monitor pulley of claim 1, further comprising lagging, wherein the lagging comprises a backing contacting the curved shell.

8. The wear monitor pulley of claim 7, wherein the at least one wear monitor is affixed to the backing of the lagging.

9. A wear monitor pulley comprising:
a pulley comprising a curved shell, cylindrical body, and a throughbore through a center of the cylindrical body, and at least one wear monitor not comprising wires or circuits extending outwardly from the at least one wear monitor that are in an elongated U-shaped configuration forming a closed loop that is connected electrically to the at least one wear monitor;
the at least one wear monitor being embedded in lagging, wherein each of the at least one wear monitor transmits a signal using electromagnetic fields when first embedded in the lagging; and
each of the at least one wear monitor signal is not detected when the lagging has been worn or sustained damage.

10. The wear monitor pulley of claim 9, wherein the at least one wear monitor is a RFID tag.

11. The wear monitor pulley of claim 9, further comprising at least two wear monitors embedded into the lagging and positioned vertically within the lagging, wherein one wear monitor is stacked on top of another wear monitor with a layer of lagging material therebetween.

12. The wear monitor pulley of claim 9, further comprising a crown point.

13. The wear monitor pulley of claim 9, wherein the at least one wear monitor is a passive wear monitor.

14. The wear monitor pulley of claim 9, wherein the at least one wear monitor is an active wear monitor.

15. A method of monitoring the wear of a pulley, comprising:
affixing at least one wear monitor not comprising wires or circuits extending outwardly from the at least one wear monitor that are in an elongated U-shaped configuration forming a closed loop that is connected electrically to the at least one wear monitor on a pulley;
creating a wear monitor pulley, wherein the at least one wear monitor is affixed to a backing, lagging, or curved shell, wherein the wear monitor pulley comprises a pulley comprising a curved shell, cylindrical body, and a throughbore through a center of the cylindrical body;
associating information and data about the wear monitor pulley with the at least one wear monitor affixed to the at least one wear monitor pulley;
transmitting a signal from each of the at least one wear monitor using electromagnetic fields from the at least one wear monitor to a wear monitor reader, wherein the signals comprise the associated information and data about the wear monitor pulley;
reading the signal sent by each of the at least one wear monitor with the wear monitor reader;
determining whether the at least one wear monitor has sent the signal; and
generating an alert when the signal was not read by the wear monitor.

16. The method of claim 15, wherein the affixing comprises affixing at least one wear monitor to the wear monitor pulley by cold welding.

17. The method of claim 15, further comprising replacing the wear monitor pulley that generated the alert when the signal was not read by the wear monitor.

18. The method of claim 15, wherein the affixing is affixing the at least one wear monitor centrally on the curved surface of the pulley.

19. The method of claim 18, wherein the affixing is embedding at least one wear monitor into the lagging.

20. The method of claim 15, further comprises analyzing the associated information and data about the wear monitor pulley sent at a time the at least one wear monitor transmitted the signal to identify a worn wear monitor pulley.

* * * * *